United States Patent
Shim et al.

(10) Patent No.: US 10,499,367 B2
(45) Date of Patent: Dec. 3, 2019

(54) METHOD FOR PERFORMING PAGING IN WIRELESS COMMUNICATION SYSTEM AND DEVICE FOR SAME

(71) Applicant: LG ELECTRONICS INC., Seoul (KR)

(72) Inventors: Hyunjin Shim, Seoul (KR); Jiwon Kang, Seoul (KR); Ilmu Byun, Seoul (KR); Heejin Kim, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/309,176

(22) PCT Filed: Jun. 9, 2017

(86) PCT No.: PCT/KR2017/005998
§ 371 (c)(1),
(2) Date: Dec. 12, 2018

(87) PCT Pub. No.: WO2017/217697
PCT Pub. Date: Dec. 21, 2017

(65) Prior Publication Data
US 2019/0313366 A1   Oct. 10, 2019

Related U.S. Application Data

(60) Provisional application No. 62/349,129, filed on Jun. 13, 2016.

(51) Int. Cl.
*H04W 68/02* (2009.01)
*H04W 56/00* (2009.01)
*H04W 76/28* (2018.01)

(52) U.S. Cl.
CPC ......... *H04W 68/02* (2013.01); *H04W 56/001* (2013.01); *H04W 76/28* (2018.02)

(58) Field of Classification Search
CPC .... H04W 68/02; H04W 76/28; H04W 56/001
(Continued)

(56) References Cited

U.S. PATENT DOCUMENTS

| 2010/0272004 | A1* | 10/2010 | Maeda | H04L 5/0007 370/312 |
|---|---|---|---|---|
| 2011/0032899 | A1* | 2/2011 | Park | H04W 68/08 370/329 |
| 2014/0128109 | A1* | 5/2014 | Li | H04W 68/02 455/458 |

FOREIGN PATENT DOCUMENTS

| EP | 2614600 | 3/2016 |
|---|---|---|
| KR | 1020090045183 | 5/2009 |

(Continued)

OTHER PUBLICATIONS

"3GPP; TSG RAN; User Equipment (UE) Procedures in Idle Mode and Procedures for Cell Reselection in Connected Mode (Release 13)," 3GPP TS 25.304 V13.0.0, Jan. 8, 2016, see section 8.

*Primary Examiner* — Nghi H Ly
(74) *Attorney, Agent, or Firm* — Dentons US LLP

(57) ABSTRACT

The present specification provides a method for performing paging in a wireless communication system. The method comprises the steps of: confirming whether or not a first paging message transmitted by means of a base station is received during a paging period; if the first paging message has not been received during the paging period, receiving one or more synchronization signals from one or more base stations; detecting a PCID and a PCID group of the one or more base stations on the basis of the one or more synchronization signals; by means of the detected PCID or PCID group, identifying one or more subframes for receiving a
(Continued)

second paging message; receiving the second paging message from the one or more identified subframes; and sequentially decoding the second paging message which has been received from the one or more subframes.

12 Claims, 12 Drawing Sheets

(58) Field of Classification Search
USPC .................. 455/458, 466, 422.1, 414.1, 418
See application file for complete search history.

(56) References Cited

FOREIGN PATENT DOCUMENTS

| KR | 1020110034827 | 4/2011 |
|----|---------------|--------|
| WO | 2010071312 | 6/2010 |

* cited by examiner

【Figure 1】
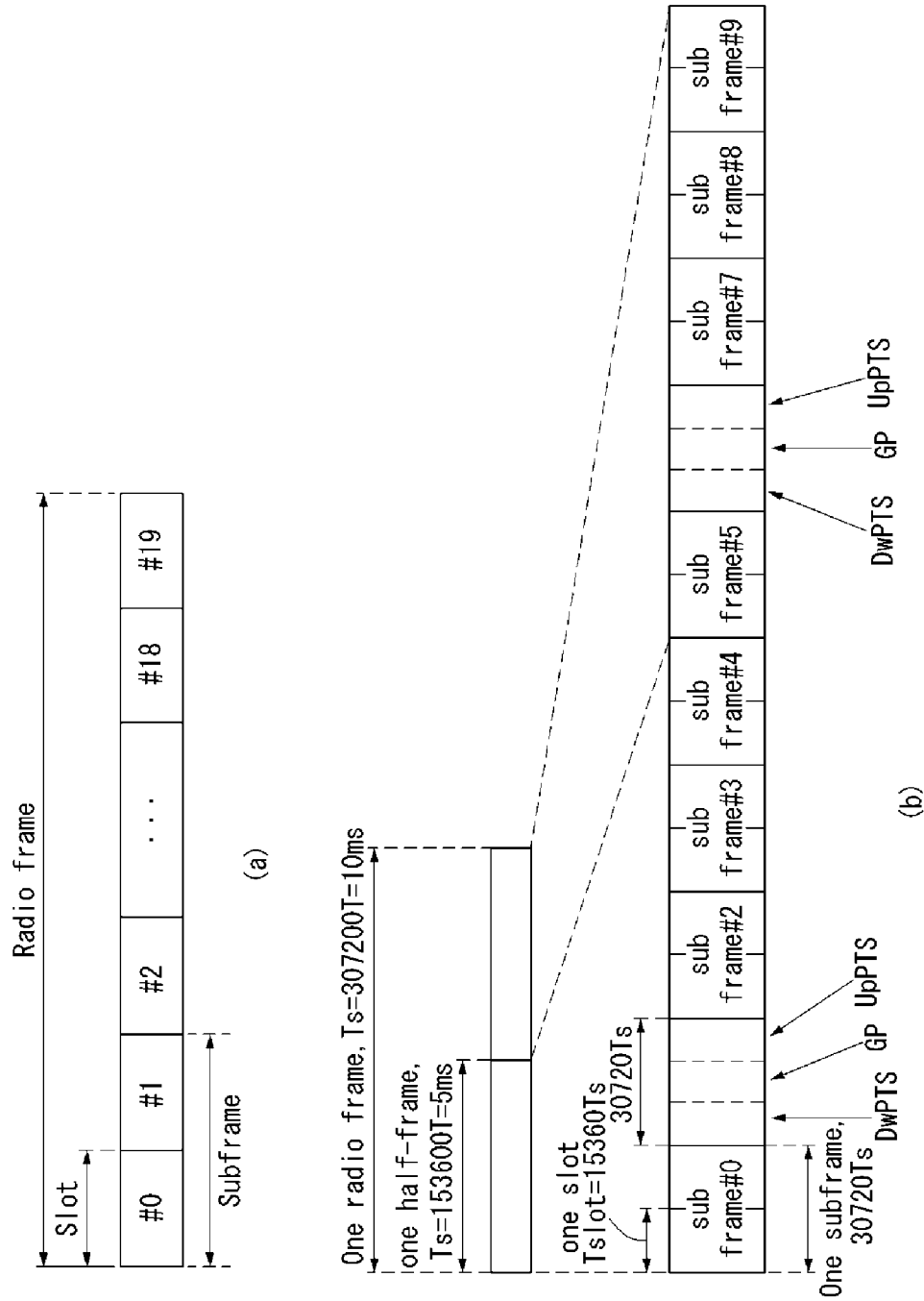

[Figure 2]
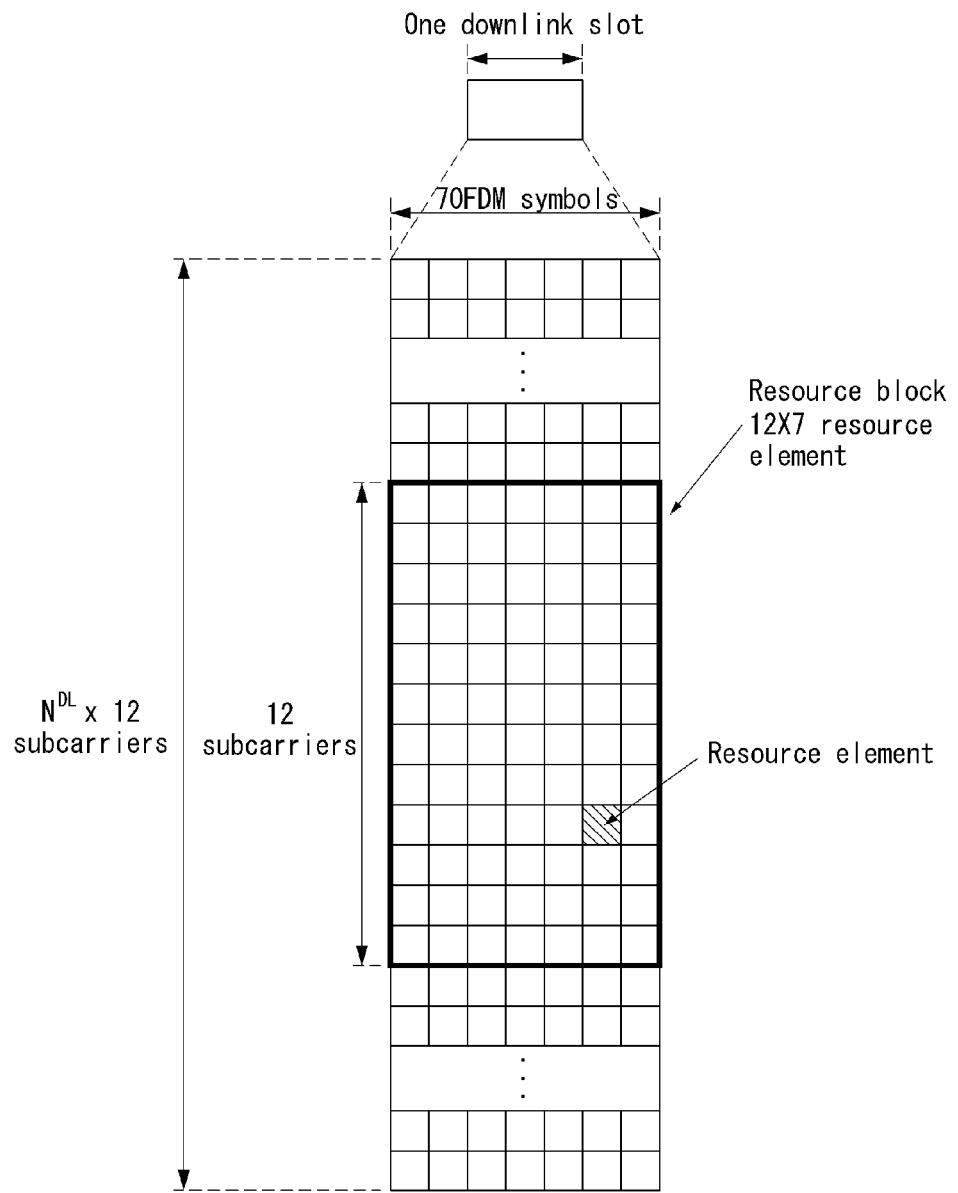

[Figure 3]
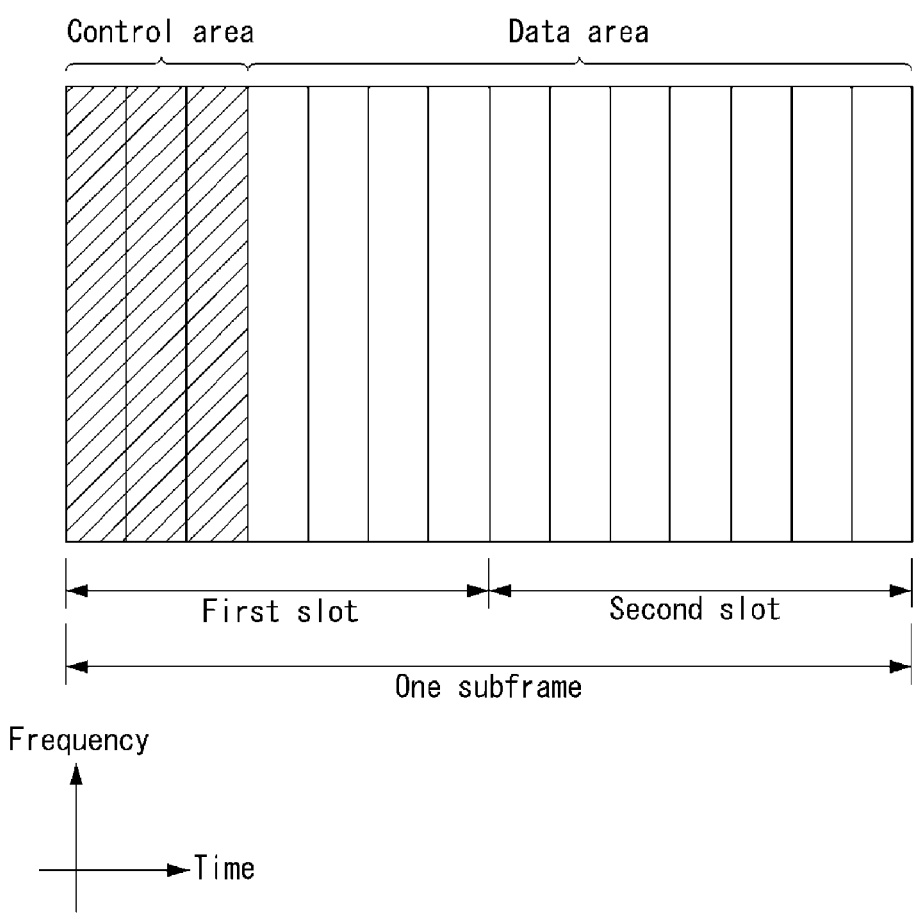

[Figure 4]
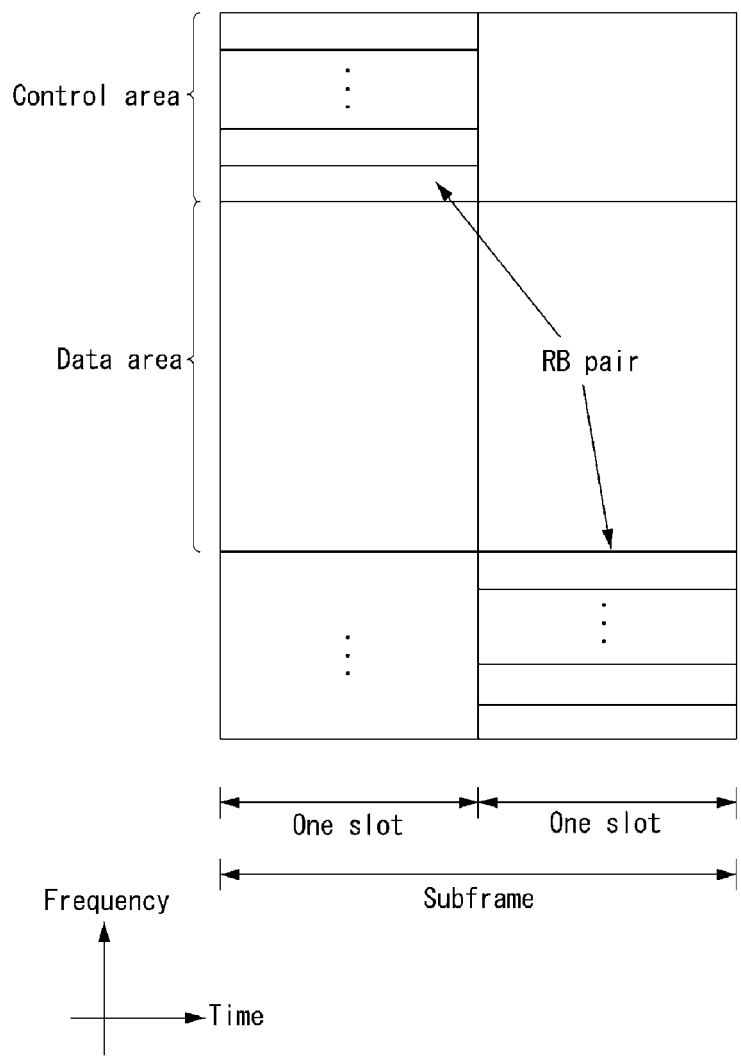

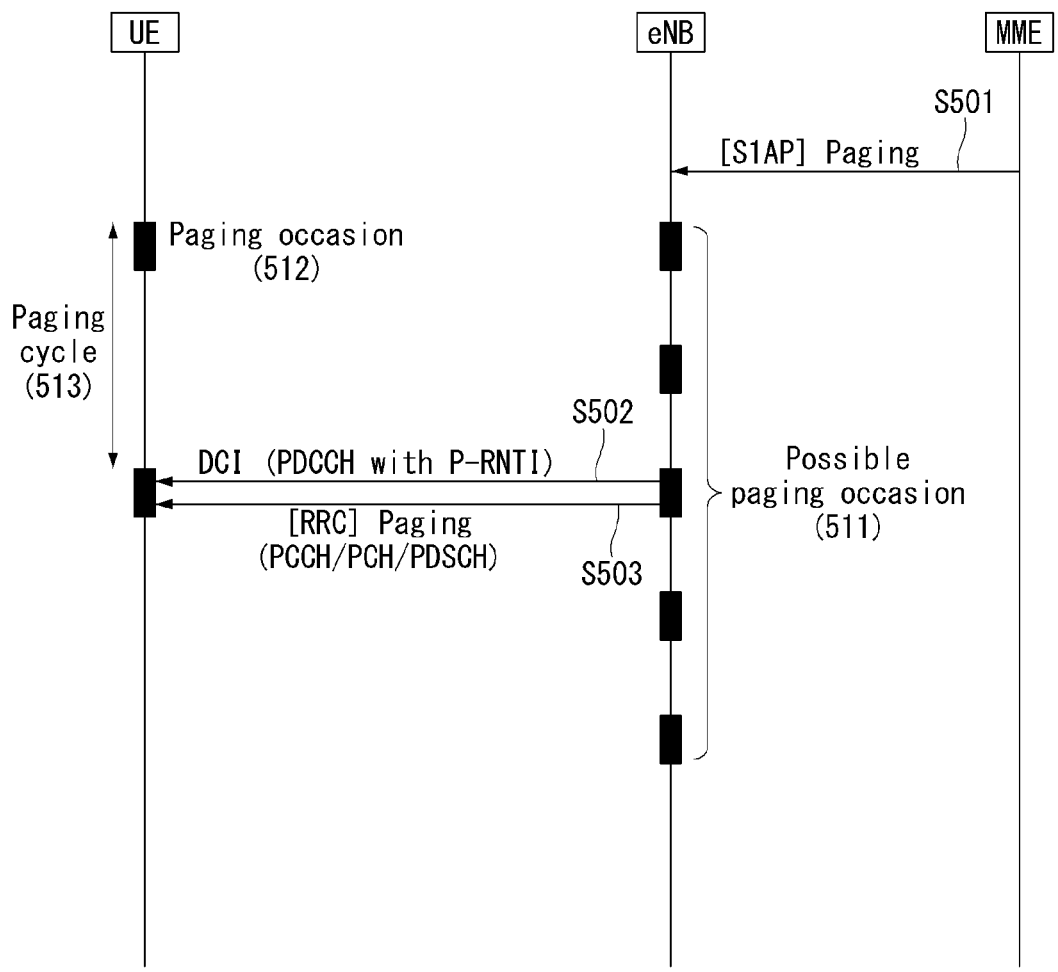

[Figure 6]
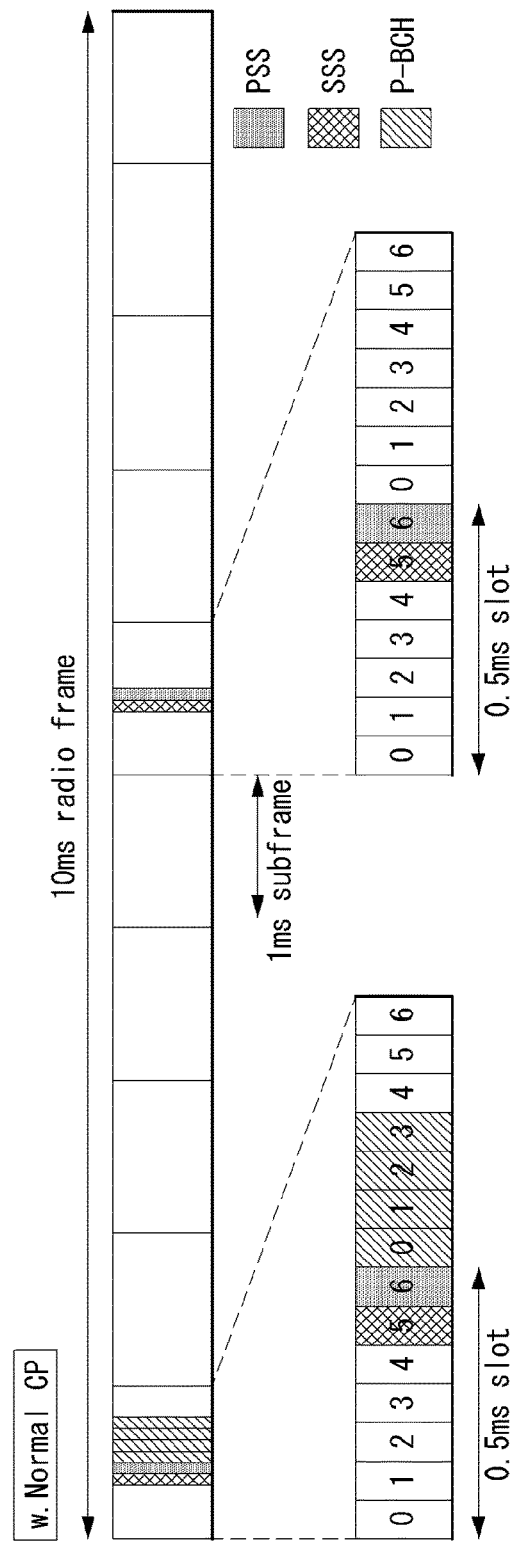

[Figure 7]
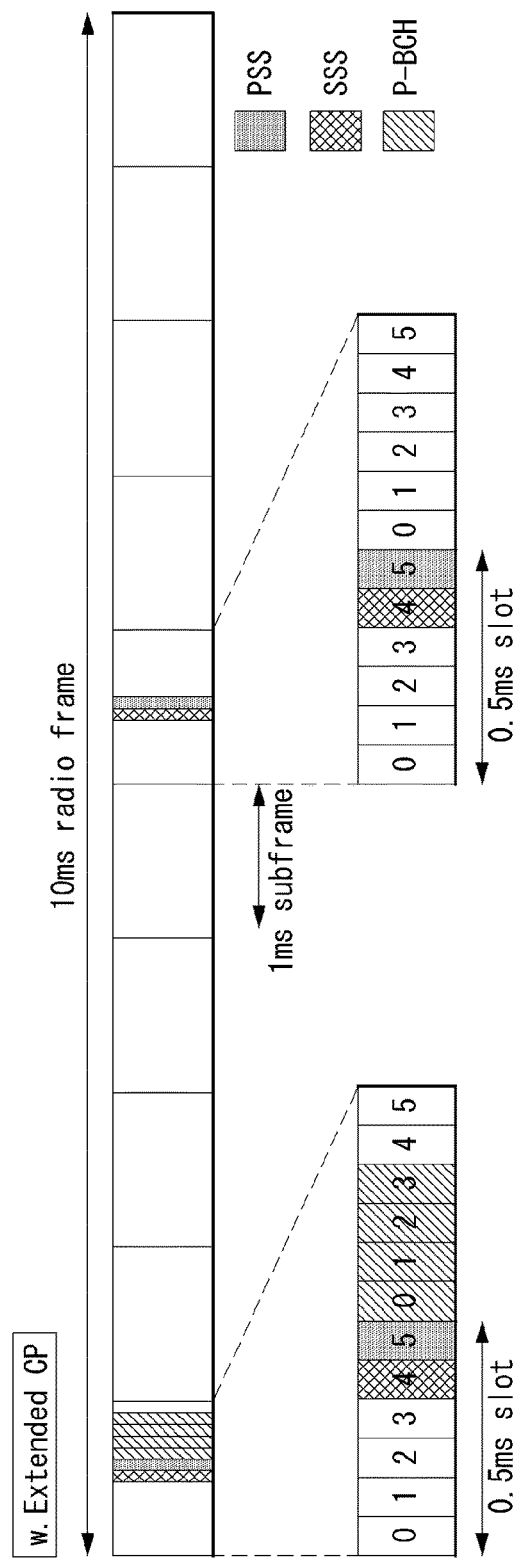

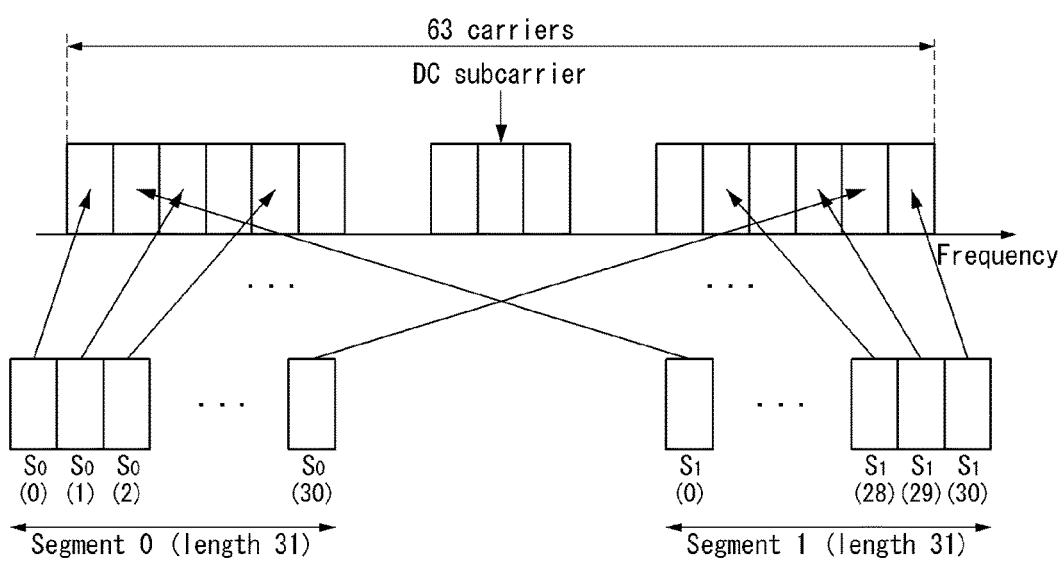
[Figure 8]

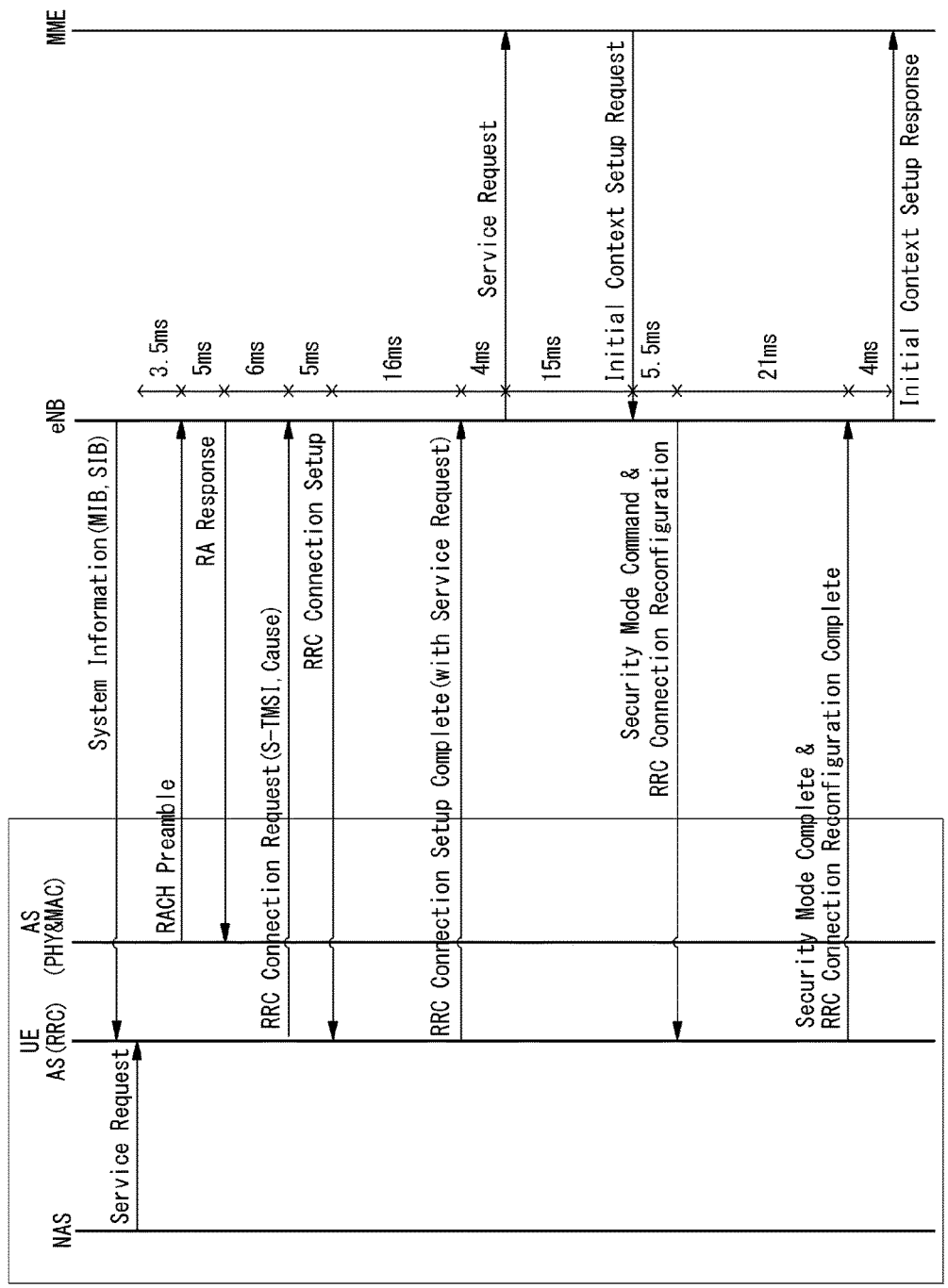
[Figure 9]

【Figure 10】
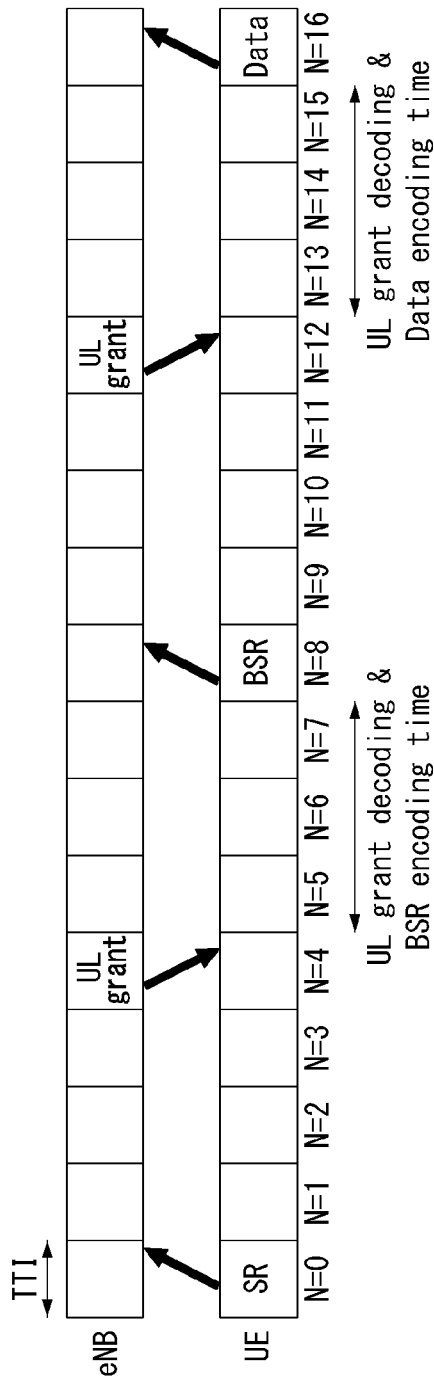

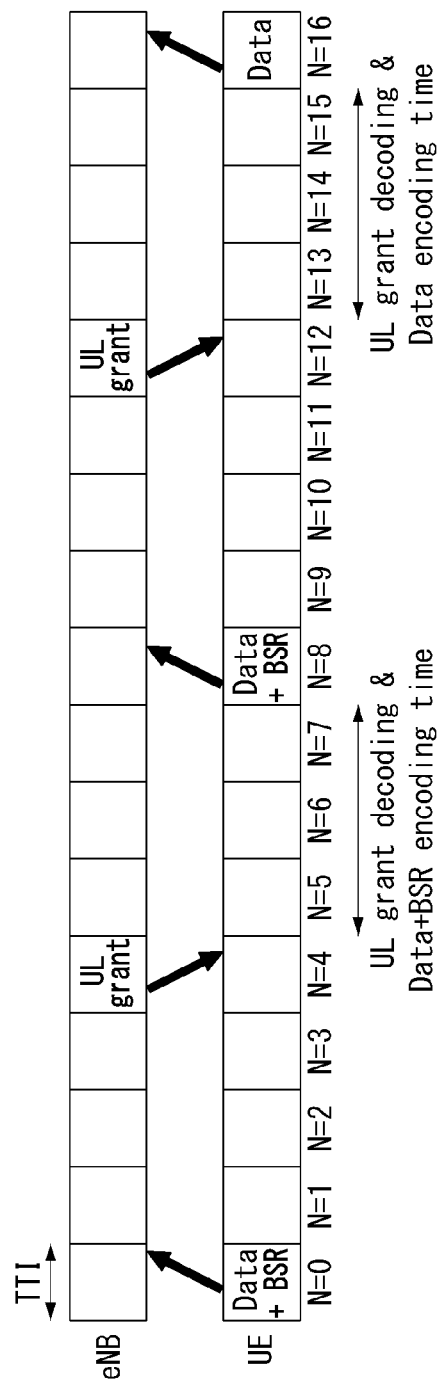
[Figure 11]

[Figure 12]
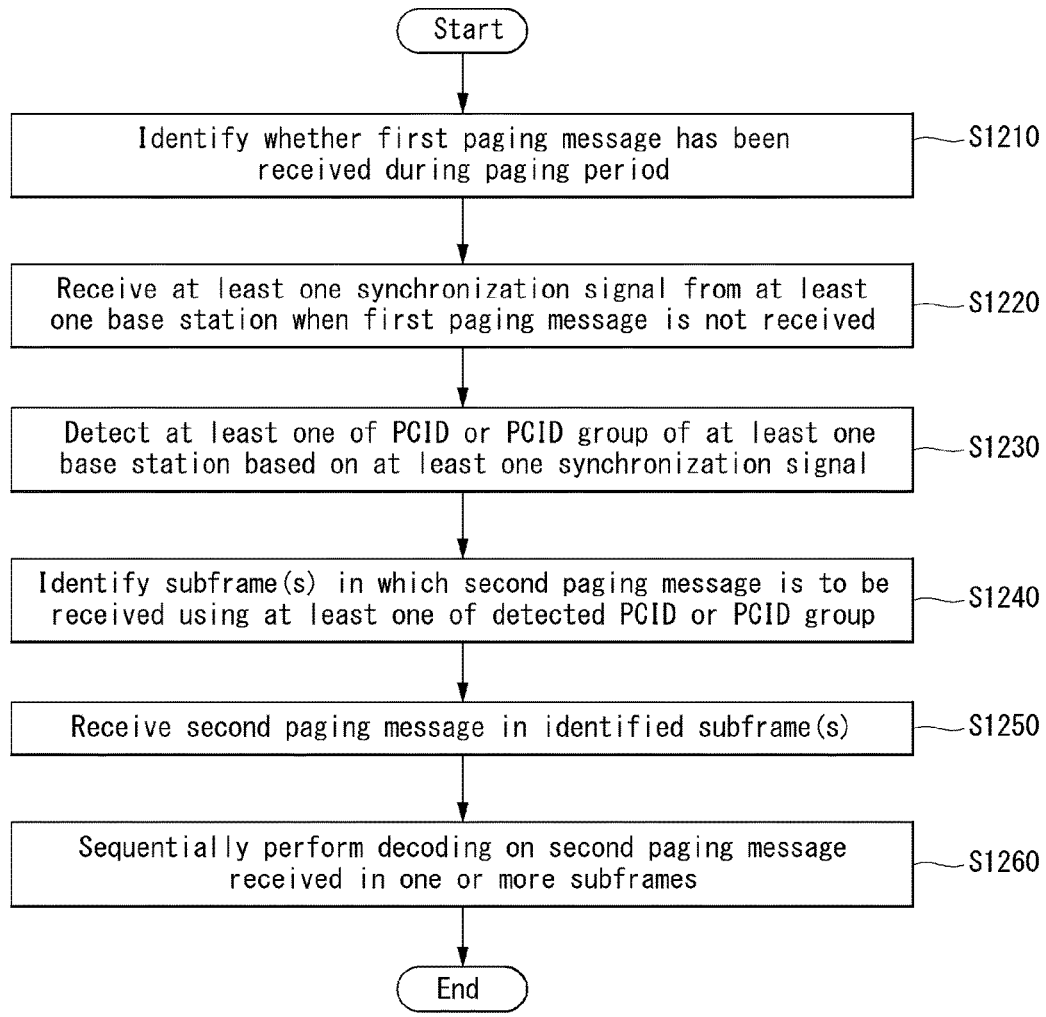
[Figure 13]
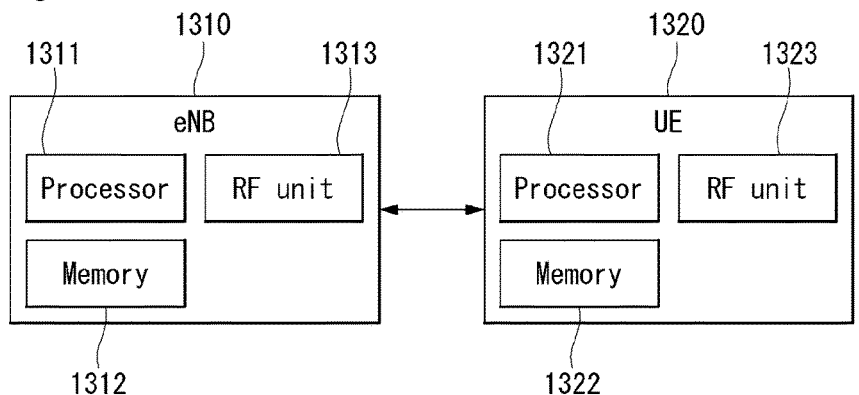

METHOD FOR PERFORMING PAGING IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/005998, filed on Jun. 9, 2017, which claims the benefit of U.S. Provisional Application No. 62/349,129, filed on Jun. 13, 2016, the contents of which are all hereby incorporated by reference herein in their entirety.

TECHNICAL FIELD

The present invention relates to a wireless communication system and, more particularly, to a method for performing paging and an apparatus supporting the same.

BACKGROUND ART

A mobile communication system has been developed to provide a voice service, while guaranteeing activity of users. However, coverage of a mobile communication system has extended up to a data service, as well as the voice service, and currently, an explosive increase in traffic has caused shortage of resources, and since users expect relatively high speed services, an advanced mobile communication system is required.

Requirements of a next-generation mobile communication system include accommodation of explosive data traffic, a remarkable increase in a transfer rate per use, accommodation of considerably increased number of connection devices, very low end-to-end latency, and high energy efficiency. To this end, various technologies such as dual connectivity, massive multiple input multiple output (MIMO), in-band full duplex, non-orthogonal multiple access (NOMA), super wideband, and device networking have been researched.

DISCLOSURE

Technical Problem

An object of this specification is to provide high reliability for paging message reception, while satisfying a latency requirement for service, in such a manner that a terminal providing low latency and high reliability service attempts the decoding of a paging message in different subframes configured based on a PCID or PCID group detected by a synchronization signal.

In particular, an object of this specification is to provide a method of attempting, by a terminal providing low latency and high reliability service, the decoding of a paging message in subframe indices sequentially configured in each PCID group and continuously performing the decoding of a paging message in a subframe index configured in a next PDCI group without switching to a DRX mode when the decoding of the paging message fails.

Furthermore, an object of this specification is to provide a method of defining a subframe index to be transmitted, including a paging message, through a previous agreement or transmitting the subframe index to a terminal through signaling.

Technical objects to be achieved in the present invention are not limited to the above-described technical objects, and other technical objects not described above may be evidently understood by a person having ordinary skill in the art to which the present invention pertains from the following description.

Technical Solution

In this specification, in a method of performing paging in a wireless communication system, the method performed by a user equipment includes identifying whether a first paging message transmitted through a base station has been received during a paging period, receiving at least one synchronization signal from at least one base station if the first paging message has not been received during the paging period, detecting the physical cell identifier (PCID) and PCID group of the at least one base station based on the at least one synchronization signal, identifying one or more subframes in which a second paging message is to be received using the detected PCID or PCID group, receiving the second paging message in the identified one or more subframes, and sequentially performing decoding on the second paging message received in the one or more subframes.

Furthermore, in this specification, when the decoding for the second paging message is successful in a specific subframe of the identified one or more subframes, decoding is not performed in a subframe subsequent to the specific subframe.

Furthermore, in this specification, the indices of the identified one or more subframes have a mapping relation with the detected PCID or PCID group. Furthermore, in this specification, the mapping relation is pre-defined or received through signaling from the base station.

Furthermore, in this specification, the synchronization signal includes a primary synchronization signal (PSS) and a secondary synchronization signal (SSS). The PCID group is detected by the primary synchronization signal (PSS). The PCID is detected by the secondary synchronization signal (SSS).

Furthermore, in this specification, the PCID group includes three PCID groups. 168, 356, 333 or 334 different PCIDs are present in one PCID group.

Furthermore, in this specification, the base station and the at least one base station are included in the same tracking area (TA).

Furthermore, in this specification, the detection sequence of the at least one synchronization signal is determined by an entity managing the tracking area.

Furthermore, in this specification, the entity is a mobility management entity (MME) or a primary base station.

Furthermore, in this specification, the user equipment is an idle state.

Furthermore, in this specification, when the first paging message is not received during the paging period, switching to a discontinuous reception (DRX) mode is not performed.

Furthermore, in this specification, a user equipment performing paging in a wireless communication system includes a radio frequency (RF) unit for transmitting and receiving radio signals and a processor functionally connected to the RF unit. The processor is configured to identify whether a first paging message transmitted through a base station has been received during a paging period, receive at least one synchronization signal from at least one base station if the first paging message has not been received during the paging period, detect the physical cell identifier (PCID) and PCID group of the at least one base station based on the at least one synchronization signal, identify one or more subframes in which a second paging message is to be received using the detected PCID or PCID group, receive the second paging message in the identified one or more subframes, and sequentially perform decoding on the second paging message received in the identified one or more subframes.

Advantageous Effects

This specification has an effect in that it can provide high reliability for paging message reception, while satisfying a latency requirement for service, in such a manner that a terminal providing low latency and high reliability service attempts the decoding of a paging message in different subframes configured based on a PCID or PCID group detected by a synchronization signal.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics) of the present invention along with the detailed description.

FIG. 1 shows the structure of a radio frame in a wireless communication system to which the present invention may be applied.

FIG. 2 is a diagram illustrating a resource grid for one downlink slot in a wireless communication system to which the present invention may be applied.

FIG. 3 shows the structure of a downlink subframe in a wireless communication system to which the present invention may be applied.

FIG. 4 shows the structure of an uplink subframe in a wireless communication system to which the present invention may be applied.

FIG. 5 is a diagram illustrating a paging procedure in a wireless communication system to which the present invention may be applied.

FIG. 6 is a diagram illustrating a frame structure used for SS transmission in a system using a basic cycle prefix (CP).

FIG. 7 is a diagram illustrating a frame structure used for SS transmission in a system using an extended CP.

FIG. 8 is a diagram illustrating that two sequences in a logical region are interleaved and mapped in a physical region.

FIG. 9 is a diagram showing an example of a connection state switching time of 3GPP LTE.

FIGS. 10 and 11 are diagrams showing examples of a method of transmitting actual data through a scheduling request and a BSR procedure.

FIG. 12 is a flowchart showing an example of a method for a UE, providing low latency and high reliability service proposed in this specification, to receive a paging message.

FIG. 13 illustrates a block diagram of a wireless communication apparatus according to an embodiment of the present invention.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "$T\_s=1/(15000*2048)$." Downlink and uplink transmission includes a radio frame having an interval of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

(NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in the resource region other than the PDCCH. The time (i.e., symbol) at which the EPDCCH in the subframe starts may be set in the UE through higher layer signaling (e.g., RRC signaling, etc.).

The EPDCCH is a resource allocation (DL) associated with the DL-SCH related to the transport format, resource allocation and HARQ information, transmission format associated with the UL-SCH, resource allocation and HARQ information, SL-SCH (Sidelink Shared Channel), and PSCCH Information, and so on. Multiple EPDCCHs may be supported and the terminal may monitor the set of EPCCHs.

The EPDCCH may be transmitted using one or more successive advanced CCEs (ECCEs), and the number of ECCEs per EPDCCH may be determined for each EPDCCH format.

Each ECCE can be composed of a plurality of enhanced resource element groups (EREGs). EREG is used to define the mapping of ECCEs to REs. There are 16 EREGs per PRB pair. All REs are numbered from 0 to 15 in the order in which the frequency increases, except for the RE carrying the DMRS in each PRB pair.

The UE can monitor a plurality of EPDCCHs. For example, one or two EPDCCH sets may be set in one PRB pair in which the terminal monitors the EPDCCH transmission.

A different coding rate for the EPCCH can be realized by merging different numbers of ECCEs. The EPOCH may use localized transmission or distributed transmission so that the mapping of the ECCE to the RE in the PRB may vary.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Paging

A paging procedure is used for a network to transmit paging information to a UE in the RRC_IDLE mode or to notify a UE in the RRC_IDLE/RRC_CONNECTED mode of a change in system information or to notify a UE in the RRC_IDLE/RRC_CONNECTED mode of ETWS primary notification and/or ETWS secondary notification or to notify a UE in the RRC_IDLE/RRC_CONNECTED mode of CMAS notification.

FIG. 5 is a diagram illustrating a paging procedure in a wireless communication system to which the present invention may be applied.

Referring to FIG. 5, an MME initiates a paging procedure by transmitting an S1AP paging message to an eNB (S501).

As described above, the location of the UE in the ECM-IDLE state is managed by the MME based on a tracking area (TA). In this case, since the UE may be registered with one or more TAs, the MME may perform transmission to multiple eNBs that cover a cell belonging to a TA(s) with which the UE has been registered. In this case, each cell may belong to only one TA, and thus each eNB may include cells belonging to different TAs.

In this case, the MME transmits a paging message to each eNB through an S1AP interface. Hereafter, this is called an "S1AP PAGING message."

Table 3 illustrates an S1AP PAGING message.

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |

Referring to Table 3, the IE/Group Name indicates the name of an information element (IE) or information element group (IE group). "M" in the Presence field is a mandatory IE and indicates an IE/IE group always included in a message. "O" is an optional IE and indicates an IE/IE group that may be included in or may not be included a message. "C" is a conditional IE and indicates an IE/IE group that is included in a message only when a specific condition is satisfied. The Range field indicates the number that repetitive IEs/IE groups may be repeated.

The IE type and reference field indicates the type (e.g., ENUMERATED, INTEGER, OCTET STRING) of a corresponding IE, and indicates the range of a value when the range of values of a corresponding IE is present.

The Criticality field indicates criticality information applied to an IE/IE group. The criticality information means information indicating how a receiving stage will operate if the receiving stage does not understand some of or the entire IE/IE group. "-" indicates that criticality information has not been applied. "YES" indicates that criticality information has been applied. "GLOBAL" indicates that one piece of criticality information is included in an IE and in the repetition of a corresponding IE in common. "EACH" indicates that unique criticality information is included in each repetition of an IE. The assigned Criticality field indicates actual criticality information.

An information element (IE) or IE group included in an S1AP PAGING message is described more specifically below.

The Tracking Area Identity (TAI) list IE is to notify an eNB of a TA in which a paging message must be broadcasted. The TAI means an identity used to uniquely identify the TA.

The closed subscriber group (CSG) ID List IE indicates a CSG set to which a UE has joined. This is used for an eNB to prevent a UE within a CSG cell to which the UE has not jointed from performing paging.

The eNB that has received the S1AP paging message from the MME configures a paging message (hereinafter referred to as an "RRC Paging message").

Table 4 illustrates an RRC Paging message.

TABLE 4

```
-- ASN1START
Paging ::=                          SEQUENCE {
    paging RecordList               Paging RecordList           OPTIONAL,   --
Need ON
    systemInfoModification          ENUMERATED {true}           OPTIONAL,   --
    etws-Indication                 ENUMERATED {true}           OPTIONAL,   --
    nonCriticalExtension            Paging-v890-IEs             OPTIONAL--
Need OP
}
Paging-v890-IEs ::=                 SEQUENCE {
    lateNonCriticalExtension        OCTET STRING
    OPTIONAL,   -- Need OP
    nonCriticalExtension            Paging-v920-IEs             OPTIONAL    --
}
Paging-v920-IEs ::=                 SEQUENCE {
    cmas-Indication-r9              ENUMERATED {true}           OPTIONAL,   --
    nonCriticalExtension            Paging-v1130-IEs            OPTIONAL-- Need
OP
}
Paging-v1130-IEs ::=                SEQUENCE {
    eab-ParamModification-r11       ENUMERATED {true}           OPTIONAL,   --
    nonCriticalExtension            SEQUENCE { }                OPTIONAL--
Need OP
}
Paging RecordList ::=               SEQUENCE (SIZE (1..maxPageRec)) OF
PagingRecord
Paging Record ::=                   SEQUENCE {
    ue-Identity                     PagingUE-Identity,
    cn-Domain                       ENUMERATED {ps, cs},
    ...
}
PagingUE-Identity ::=               CHOICE {
    s-TMSI                          S-TMSI,
    imsi                            IMSI,
    ...
}
IMSI ::=                            SEQUENCE (SIZE (6..21)) OF IMSI-Digit
IMSI-Digit ::=                      INTEGER (0..9)
-- ASN1STOP
```

The Message Type IE uniquely identifies a transmitted message.

The UE Identity Index value IE is used for an eNB to calculate a paging frame (PF) (e.g., UE Identity Index=UE IMSI mod 1024).

The UE Paging Identity IE is an identity to identify a paged UE and is indicated as one of an IMSI and an SAE temporary mobile subscriber identity (S-TMSI). The S-TMSI means an identity by which a UE can be uniquely identified within one MME group.

The Paging DRX IE is used for an eNB to calculate a paging frame (PF) when a UE uses a UE-specific DRX cycle length. The UE may specify the DRX cycle length in an Attach Request message or a tracking area update (TAU) message.

The CN Domain IE indicates whether paging has occurred in a circuit switched (CS) domain or a packet switched (PS) domain.

Referring to Table 4, a single RRC paging message may carry multiple S1AP paging messages. That is, the RRC paging message may include multiple paging records (e.g., 16) for paging multiple UEs.

Each paging record includes a UE identity (ue-Identity) field and a CN domain (cn-Domain) field. This is content delivered from an S1AP Paging message.

The system information change (systemInfoModification) field is not delivered form an S1AP Paging message and is generated by an eNB. This field is used to trigger a UE so that the UE re-acquires a system information block (SIB) set.

The extended access barring (EAB) parameter change (eab-ParamModification) field is used to indicate an EAB parameter (SIB 14) change.

The ETWS indication (etws-Indication) field is not delivered from an S1AP Paging message and is generated by an eNB. This field is applied to only an ETWS capable UE and is used to trigger a corresponding UE so that the UE re-acquires SIB 1. The SIB 1 content indicates ETWS content within SIB 10 and SIB 11 with respect to the UE.

The CMAS indication (cmas-Indication) field is applied to only a CMAS capable UE and is used to trigger a corresponding UE so that the UE re-acquires SIB 1. SIB 1 content indicates CMAS content within SIB 12 with respect to the UE.

The eNB that has configured the RRC Paging message as described above transmits downlink control information (DCI) to which cyclic redundancy check (CRC) scrambled with a paging-RNTI (P-RNTI) has been attached to the UE in a PDCCH (S502), and transmits the RRC paging message to the UE through a PDSCH (S503).

That is, the eNB delivers the RRC Paging message to the UE through a PCCH logical channel, a PCH transport channel, a PDSCH physical channel.

More specifically, the eNB determines a PDCCH format based on DCI to be transmitted to the UE and attaches CRC to the DCI. A unique radio network temporary identifier (RNTI) is scrambled (or masked) into the CRC depending on the owner or use of a PDCCH. In the case of a PDCCH for a specific UE, a unique identifier (e.g., cell-RNTI (C-RNTI)) of the UE may be masked into CRC. Alternatively, in the case of a PDCCH for a paging message, a paging indication identifier (e.g., paging-RNTI (P-RNTI)) may be masked into CRC.

That is, the UE monitors a PDCCH based on a P-RNTI in a subframe belonging to its own paging occasion 512. Furthermore, when a PDCCH masked with a P-RNTI is detected, the UE decodes DCI transmitted on the PDCCH. The DCI indicates a PDSCH resource in which a paging message has been transmitted to the UE. Furthermore, the UE decodes an RRC paging message from a PDSCH resource indicated in the DCI.

A paging cycle 513 may be determined in a cell-specific manner. Furthermore, it may be determined in a UE-specific manner. Furthermore, a paging occasion 512 is determined based on its own paging cycle 513 and its own identity (i.e., IMSI) for each UE. Accordingly, a paging message is not transmitted to all UEs at a possible paging occasion 511 of the eNB, and the paging message is transmitted based on the paging occasion of a corresponding UE. The paging occasion is described more specifically later.

A paging procedure may be used to provide notification of a change in system information and whether a cell broadcast message (i.e., ETWS/CAMS warning message) has been received and of a change in EAB in addition to whether a mobile terminated (MT) call of an individual UE has been received.

If a UE identity (e.g., IMSI or S-TMSI) is included in any one of paging records included in the RRC paging message (i.e., if a paging procedure is used as MT call use), the UE in the RRC_IDLE mode initiates a random access procedure in order to establish an RRC connection with a network (e.g., service request transmission).

Furthermore, if a system information change (system InfoModification) is included in the RRC paging message, the UE re-acquires required system information using a system information acquisition procedure.

Furthermore, if ETWS indication (etws-Indication) is included in the RRC paging message and the UE supports ETWS, the UE immediately re-acquires SIB 1. That is, the UE does not wait until a next system information change period boundary. Furthermore, if a scheduling information list (schedulingInfoList) included in SIB 1 indicates that SIB 10 is present, the UE acquires SIB 10 based on scheduling information (schedulingInfor). Furthermore, if a scheduling information list (schedulingInfoList) included in SIB 1 indicates that SIB 11 is present, the UE acquires SIB11 based on scheduling information (schedulingInfor).

Furthermore, if CMAS indication (cmas-Indication) is included in the RRC paging message and the UE supports CMAS, the UE immediately re-acquires SIB 1. That is, the UE does not wait until a next system information change period boundary. Furthermore, if a scheduling information list (schedulingInfoList) included in SIB 1 indicates that SIB 12 is present, the UE acquires SIB12 based on scheduling information (schedulingInfor).

As described above, if a cell broadcast message (i.e., ETWS/CAMS message) indication is included in the RRC paging message, the UE receives SIB 10, SIB 11, SIB 12 with reference to schedulingInfoList of SIB 1. The received SIB 10, SIB 11, SIB 12 is delivered as a higher layer (e.g., RRC layer) of the UE. If a message identifier belonging to a cell broadcast message delivered through SIB 10, SIB 11, SIB 12 is included in the search list of the UE, the higher layer of the UE displays the message identifier and discards it if not.

Furthermore, if a UE in the RRC_IDLE mode supports EAB and an EAB parameter change (eab-ParamModification) field is included in the RRC paging message, the UE considers that a previously stored SIB 14 is not valid and immediately re-acquires SIB 1. That is, the UE does not wait until a next system information change period boundary. Furthermore, the UE re-acquires SIB 14 using a system information acquisition procedure.

Discontinuous Reception for Paging

A UE may use discontinuous reception (DRX) in an idle mode so as to reduce power consumption.

One paging occasion (PO) is a subframe for an NB-IoT on a P-RNTI transmitted through a PDCCH or an MPDCCH or an NPDCCH addressing a paging message.

In a P-RNTI transmitted in an MPDCCH, a PO denotes the starting subframe of MPDCCH repetition.

In the case of a P-RNTI transmitted through an NPDCCH, a PO indicates the starting subframe of NPDCCH repetition.

However, if a subframe determined by a PO is not a valid NB-IoT downlink subframe, the first valid NB-IoT downlink subframe after the PO indicates the starting subframe in which an NPDCCH is repeated.

One paging frame (PF) is one radio frame that may include one or multiple paging occasions.

When DRX is used, a UE needs to monitor one PO per DRX cycle.

One paging narrowband (PNB) is one narrowband in which a UE performs paging message reception.

A PF, PO and PNB are determined according to a next equation using a DRX parameter provided in system information.

$$SFN \bmod T = (T \text{ div } N) * (UE\_ID \bmod N) \quad \text{[Equation 1]}$$

In a subframe pattern, index i_s indicative of a PO is acquired from next calculation.

$$i\_s = \text{floor}(UE\_ID/N) \bmod Ns \quad \text{[Equation 2]}$$

If a P-RNTI is monitored on an MPDCCH, a PNB is determined by Equation 3.

$$PNB = \text{floor}(UE\_ID/(N*Ns)) \bmod Nn \quad \text{[Equation 3]}$$

If a P-RNTI is monitored on an NPDCCH and a UE supports paging in a non-anchor carrier and a paging configuration for the non-anchor carrier is provided in system information, a paging carrier is determined by a minimum paging carrier n satisfying Equation 4.

$$\text{floor}(UE\_ID/(N*Ns)) \bmod \sum_{j=0}^{j=(maxPagingCarriers-1)} \text{Weight}[j] < \sum_{k=0}^{k=(n-1)} \text{Weight}[k]$$ [Equation 4]

A system information DRX parameter stored in a UE is locally updated in a UE whenever DRX parameter values are changed in an SI.

If the UE does not have an IMSI, for example, when an emergency call is made without an USIM, the UE uses UE_ID=0 as a default identity in Equation PF, i_s and PNB.

The next parameters is used to calculate a PF, i_s, PNB and NB-IoT paging carrier.

T: DRX cycle of a UE. A UE-specific extended DRX value of a 512 radio frame other than the NB-IoT is configured as T=512 by a higher layer.

If not, T is determined to be the shortest of UE-specific DRX values if it is allocated by a higher layer, and a default DRX value is broadcasted in system information.

If UE-specific DRX is not configured by a higher layer, a default value is applied.

UE-specific DRX is not applied to the NB-IoT.

NB: 4T, 2T, T, T/2, T/4, T/8, T/16, T/32, T/64, T/128 and T/512 and T/1024 for the NB-IoT.

N: min (T, nB)

Ns: max (1, nB/T)

Nn: the number of paging narrowbands provided in system information

UE_ID:

IMSI mod 1024, when a P-RNTI is monitored on a PDCCH.

IMSI mod 4096, when a P-RNTI is monitored on an NPDCCH.

IMSI mod 16384, when a P-RNTI is monitored on an MPDCCH or a P-RNTI is monitored on an NPDCCH and a UE supports paging in a non-anchor carrier and a paging configuration for a non-anchor carrier is provided in system information.

maxPagingCarriers: the number of configured paging carriers provided in system information.

weight(i): weight for an NB-IoT paging carrier i.

IMSI is given as the sequence of the numbers of an integer (0 . . . 9).

In the above equation, an IMSI needs to be interpreted as 10 decimals, and the first number given in the sequence indicates the highest number.

For example, in an IMSI=12 (digit1=1, digit2=2), this is interpreted as a decimal "12" not "1×16+2=18".

Subframe Patterns

<FDD>

When a P-RNTI is transmitted through a PDCCH or NPDCCH or a P-RNTI is transmitted through an MPD-CCH where system bandwidth>3 MHz:

TABLE 5

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

When a P-RNTI is transmitted through an MPDCCH of system bandwidth 1.4 MHz and 3 MHz:

TABLE 6

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

<TDD (all UL/DL Configurations)>

When a P-RNTI is transmitted through a PDCCH or a P-RNTI is transmitted through an MPDCCH where system bandwidth>3 MHz:

TABLE 7

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

When a P-RNTI is transmitted through an MPDCCH of a system bandwidth 1.4 MHz and 3 MHz:

TABLE 8

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Synchronization Signal/Sequence (SS)

An SS includes a Primary (P)-SS and a Secondary (S)-SS, and corresponds to a signal used when cell search is performed.

FIG. 6 is a diagram illustrating a frame structure used for SS transmission in a system using a basic cycle prefix (CP). FIG. 7 is a diagram illustrating a frame structure used for SS transmission in a system using an extended CP.

An SS is transmitted the second slots of a secondary frame (or subframe) No. 0 and subframe No. 5 by taking into consideration 4.6 ms, that is, a global system for mobile communications (GSM) frame length for the easy of inter-radio access technology (RAT) measurement, and the boundary of a corresponding radio frame may be detected through an S-SS. A P-SS is transmitted in the last OFDM symbol of a corresponding slot, and an S-SS is transmitted in an OFDM symbol right before the P-SS.

An SS may transmit a total of 504 physical layer cell identities (physical cell IDs) through a combination of 3 P-SSs and 168 S-SSs. Furthermore, an SS and a PBCH are transmitted within 6 RBs within a system bandwidth so that they can be detected or decoded by a UE regardless of a transmission bandwidth.

A transmission diversity method of an SS uses only a single antenna port and is not separately defined in the standard. That is, a transmission diversity method of an SS may use a single antenna transmission or UE-transparent transmission method (e.g., precoder vector switching (PVS), time-switched transmit diversity (TSTD), cyclic-delay diversity (CDD)).

1. P-SS Code

A Zadoff-Chu (ZC) sequence of a length 63 may be defined in a frequency region and used as the sequence of a P-SS. The ZC sequence is defined by Equation 5, and a sequence element n=31 corresponding to a DC subcarrier is punctured. In Equation 5, N_zc=63.

[Equation 5]

$$d_u(n) = e^{-j\frac{\pi u n(n+1)}{N_{ZC}}}$$

The remaining 9 subcarriers of 6 RBs (=7 subcarriers) located at the frequency region center are always transmitted as a value of 0 and facilitates the filter design for synchronization execution. In order to define a total of 3 P-SSs, in Equation 5, the values of u=25, 29 and 34 may be used. In this case, 29 and 34 have a conjugate symmetry relation, and thus 2 correlations may be performed at the same time. In this case, the conjugate symmetry means Equation 6, and overall computation load can be reduced by about 33.3% because a one-shot correlator for u=29 and 34 can be implemented using this characteristics.

$d_u(n)=(-1)^n(d_{N_{ZC}-u}(n))^*$, when $N_{ZC}$ is even number.

$d_u(n)=(d_{N_{ZC}-u}(n))^*$, when $N_{ZC}$ is odd number. [Equation 6]

2. S-SS Code

A sequence used for an S-SS transmits 168 cell group IDs by using two m-sequences of a length 31 as an interleaved junction and combining two sequences. The m-sequence as the sequence of an S-SS is robust against a frequency optional environment, and can reduce computational load through fast m-sequence transform using fast Hadamard transform. Furthermore, to configure an S-SS using two short codes has been proposed to reduce computational load of a UE.

FIG. 8 is a diagram illustrating that two sequences in a logical region are interleaved and mapped in a physical region.

Referring to FIG. 8, when two m-sequences used to generate an S-SS code are S1 and S2, if the S-SS of a subframe 0 transmits a cell group identity through (S1, S2) two combinations, the S-SS of a subframe 5 is swapped and transmitted through (S2, S1), thereby being capable of identifying a 10 ms frame boundary.

In this case, the S-SS code uses a generator polynomial of x^5+x^2+1, and a total of 31 codes may be generated through different circular shifts.

In order to enhance reception performance, P-SS-based different two sequences are defined and are scrambled into an S-SS, but S1 and S2 may be scrambled as different sequences. Thereafter, an S1-based scrambling code may be defined to perform scrambling on S2. In this case, the code of the S-SS is switched in a 5 ms unit, but the P-SS-based scrambling code is not switched. The P-SS-based scrambling code is defined as a 6-circular shift version based on a P-SS index in the m-sequence generated from the generator polynomial of x^5+x^2+1. The S1-based scrambling code is defined as an 8-circular shift version based on the index of S1 in the m-sequence from the polynomial of x^5+x^4+x^2+x^1+1.

In 3GPP LTE, an idle state UE needs to perform an RRC connection configuration and data connection configuration before it performs data transmission.

This means that both the logical connection (RRC connection) between a base station and the UE and the logical connection (S1 connection/interface, EPS connection) between a mobility management entity (MME) and the UE are set up.

In a conventional technology, a procedure for a connection configuration and the time taken for the connection configuration are as follows.

Connection state switching time (other than backhaul transmission time) of a conventional technology
RRC connection configuration: 35.5 ms delay occurred
Security configuration and data connection configuration for a radio link: 49.5 ms delay occurred
Connection state switching time of an idle state UE: a total of 85 ms FIG. 9 is a diagram showing an example of a connection state switching time of 3GPP LTE.

Furthermore, a UE trying to transmit uplink data after switching to a connection state needs to experience the step of making a scheduling request from an eNB. FIGS. 10 and 11 are diagrams showing the procedure of a corresponding process and corresponding delay.

That is, FIGS. 10 and 11 are diagrams showing examples of a method of transmitting actual data through a scheduling request and a BSR procedure.

FIG. 10 is a diagram showing the time taken for a UE to transmit actual data through a 5-step scheduling request procedure using a PUCCH SR resource.

As shown in FIG. 10, the UE may transmit actual uplink data after about 17 ms from the time when the UE transmits an SR signal.

In this case, an SR resource allocated to the UE has a specific period and may be allocated on a PUCCH and may be allocated in a minimum 1 ms~a maximum of 80 ms period.

In this case, if an SR of a 1 ms period has been allocated to the corresponding UE, an average time taken for the UE to wait for the PUCCH resource for SR transmission is 0.5 ms. A delay time until data transmission to the eNB through a scheduling request is 17.5 ms.

If the UE has an uplink resource previously allocated by the eNB, the UE may transmit a resource request for newly generated data using the previously allocated resource.

Alternatively, the UE may request an additional resource from the eNB by transmitting the BSR in data transmitted through the previously allocated resource.

In this case, as shown in FIG. 11, it may be seen that delay of 9 ms occurs until the UE transmits uplink data after it transmits the BSR.

It is expected that Internet of Things (IoT) services of various industries will be introduced in the 5G communication system.

After a single idle state UE switches to a connection state, time of a total of 94-102.5 ms is taken for the UE to receive a downlink message successfully.

When the UE fails in downlink message reception, the UE switches to an idle state again, and thus additional delay occurs until the UE receives a next Paging message.

Accordingly, in order to increase reliability of a paging message transmitted to a UE in the idle state providing single low latency and high reliability service, it is necessary to redundantly transmit and receive paging message in a short period.

Furthermore, in the existing LTE/LTE-A system, a paging message is transmitted in a tracking area (TA) unit.

In order to improve reception reliability of an idle state UE providing low latency and high reliability service, if a paging message is redundantly transmitted to all UEs within a TA in a short period, a disadvantage in that many resources are wasted may occur.

Accordingly, a single UE of the idle state providing low latency and high reliability service of a 5G communication system needs to receive a paging message efficiently and with high reliability.

However, as described above, to shortly configure the period of a paging message and to transmit a corresponding paging message to all UEs of the idle state in a TA unit generate much resource waste. There is a need for the development of a technology capable of improving reception reliability of a paging message through coordination between a single UE of the idle state and neighboring cells.

Furthermore, in the current 3GPP LTE/LTE-A system, when the reception of a paging message fails in a corresponding paging occasion (i.e., subframe in which a P-RNIT is transmitted through a PDCCH) after cell search, a corresponding UE switches to the DRX mode. Accordingly, additional delay occurs because the UE waits until a next paging occasion in order to receive a paging message.

In order to solve such a problem, this specification provides a method for a UE to perform the decoding of a paging message in a different subframe by performing cell search without switching to a DRX mode although the UE does not receive the paging message at a corresponding paging occasion after cell search.

That is, a method proposed in this specification provides a method of improving reception reliability of a paging message while satisfying a latency requirement for service in such a manner than a single UE of the idle state providing low latency and high reliability service attempts the decoding of a paging message in a different subframe configured based on a PCID or PCID group detected as a synchronization signal.

Hereafter, a method for improving reception reliability for the paging message of a UE, proposed in this specification, is described.

Unless described otherwise in this specification, it is assumed that a UE is a UE of an idle state providing low latency and high reliability service, which may be applied to a 5G wireless communication system.

In this case, the method proposed in this specification is not limited a low latency and high reliability idle state UE.

First, one or more base stations belonging to the same tracking area (TA) may differently configure subframe indices in which a paging message is transmitted based on a physical layer cell identity (PCID) or physical layer cell ID (PCID) group, and may transmit them to a UE.

That is, a subframe index in which the paging message is transmitted is configured in a synchronization signal through which the PCID or the PCID group is detected.

Furthermore, different subframes indices may be configured in different synchronization signals.

In this case, the subframe index means an index indicative of a subframe in which the paging message is transmitted.

A base station may be represented as a transmission reference point (TRP).

In this case, a network may manage a candidate group capable of transmitting a synchronization signal in a tracking area unit.

The network may be represented as a tracking area (TA) management device. The TA management device may be an MME, a primary BS, for example.

Furthermore, the network has information about the synchronization signal transmission of eNBs within a tracking area, and thus the network may designate the sequence that the synchronization signal is detected with respect to a UE based on information about the synchronization signal transmission of the eNBs (in order of higher detection probability of the synchronization signal).

In particular, the network may differently allocate a subframe index in which a paging message is transmitted to a UE providing low latency and high reliability service based on a PCID sequence identified (or detected) by a synchronization signal.

Accordingly, when the UE receives the synchronization signal from the eNB (or when it identifies a PCID sequence based on the received synchronization signal), it can be aware that the paging message is transmitted through which subframe.

Accordingly, this specification can improve reception reliability for the paging message of a UE because it enables a UE to make several detection attempts on multiple synchronization signals transmitted through multiple eNBs.

Thereafter, the UE receives multiple synchronization signals from multiple eNBs and identifies a subframe or a subframe index in which the paging message is transmitted.

As described above, subframe or a subframe index in which a paging message is transmitted is mapped to each synchronization signal. The subframe or subframe index mapped to each synchronization signal may be different. In this case, in order to minimize the time taken for the UE to wake for paging reception, it is preferred that different subframes indices mapped to synchronization signals are allocated to have consecutive values.

Thereafter, the UE sequentially decodes paging messages in the identified subframes (corresponding to the subframe indices).

An operation for the UE to sequentially decode the paging messages in the subframes continues until the UE successfully receives the paging messages.

In this case, after the UE fails in paging message decoding in the first subframe, when the UE succeeds in paging message decoding in the second subframe, the UE may combine and decode a first signal (paging message in the first subframe) and a second signal (paging message in the second subframe).

That is, the UE identifies that an eNB transmitting each synchronization signal transmits a paging message in which subframe by attempting detection for synchronization signals transmitted by adjacent one or more eNBs.

Furthermore, although the UE fails in the demodulation of a paging message transmitted by a specific eNB in a specific subframe, the UE repeatedly performs detection for a paging message in a different subframe mapped to a synchronization signal transmitted by a different eNB.

The above-described method of receiving a paging message, proposed in this specification, may be basically divided into (1) a method of differently configuring a subframe index in which a paging message is transmitted based on a PCID group (first embodiment) and (2) a method of differently configuring a subframe index in which a paging message is transmitted based on a PCID (second embodiment).

Hereafter, a method for a UE to receive a paging message according to each embodiment is described more specifically.

First Embodiment

The first embodiment relates to a method of differently configuring a subframe index in which a paging message is transmitted based on a PCID group.

In this case, the PCID group may be detected based on the above-described primary synchronization signal (PSS). Accordingly, the first embodiment may be interpreted as differently configuring a subframe index in which a paging message is transmitted based on a primary synchronization signal.

A network (1) may previously define a subframe index as a mapping rule or (2) may deliver or transmit a subframe index to a UE within a tracking area through signaling so that the subframe index in which a paging message is to be transmitted is differently mapped to an N physical layer cell ID group.

For example, as described above, in the LTE/LTE-A system, physical layer cell IDs (PCIDs) are grouped into three, and have 3 sequences.

In this case, each PCID group may be constructed with sequences having different root indices (0, 1, 2).

Sequences having the same root index may be configured as one PCID group.

Accordingly, the three PCID groups may be mapped to different subframe indices.

In this case, the subframe index indicates the index of a subframe in a paging message is transmitted and received.

That is, mapping information between the PCID group and the subframe index in which the paging message is transmitted may be defined as a previously agreed rule or a network may deliver (or transmit) the mapping information to a UE through signaling.

For example, the mapping information (between the PCID group and the subframe index) may be included in a system information block and transmitted to the UE.

Table 9 shows an example of the mapping relation between physical cell ID (PCID) groups and subframe indices in which paging messages are transmitted.

TABLE 9

| PCID group | Subframe index |
| --- | --- |
| PCID group 0 | 1, 2 |
| PCID group 1 | 3, 4 |
| PCID group 2 | 5, 6 |

Thereafter, if information to which a subframe index in which a paging message will be transmitted has been mapped is allocated to the UE in N PCID groups from the network through signaling or is previously determined by a rule, the UE sequentially attempts decoding on paging messages in subframe indices configured for each PCID group until it succeeds in the decoding of the paging messages.

For example, as described above, in the LTE/LTE-A system, an idle state UE receives a main synchronization signal (i.e., primary synchronization signal) from an eNB in the first and eleventh slots of each radio frame.

In this case, the UE identifies the above-described PCID group based on the primary synchronization signal.

In this case, the UE sequentially attempts the decoding of the paging messages in the subframe indices configured for each PCID group (or for each primary synchronization signal).

In this case, although the UE does not decode a paging message in a specific subframe, it does not switch to a DRX mode and continues to perform the decoding of a paging message in a subframe index configured in a next PCID group.

For example, if the UE decodes paging messages in subframes (subframe indices 1, 2) corresponding to a PCID group "0", the UE stops the decoding operation for the reception of the paging message.

If the UE does not decode the paging messages in the subframes (subframe indices 1, 2) corresponding to the PCID group "0", the UE sequentially performs the decoding of paging messages in subframes corresponding to a PCID group "1" and a PCID group "2". Such an operation continues until the UE succeeds in the reception of paging messages.

Second Embodiment

The second embodiment relates to a method of differently configuring a subframe index in which a paging message is transmitted based on a PCID.

In this case, the PCID may be detected based on the above-described secondary synchronization signal (SSS). Accordingly, in the second embodiment, a subframe index in which a paging message is transmitted may be interpreted as being differently configured based on the secondary synchronization signal.

A network may (1) define a subframe index in which a paging message will be transmitted in the M cell IDs of the same PCID group as a mapping rule or (2) may transmit the subframe index to a UE within a tracking area through signaling.

For example, as described above, in the LTE/LTE-A system, one PCID group includes 168 (index 0~index 167) cell IDs (or PCIDs).

The index of a subframe in which a paging message is transmitted may be differently mapped to the M (1≤M≤168) cell IDs of the 168 cell IDs.

In this case, mapping information between a PCID within the same PCID group and the subframe index in which the paging message is transmitted may be defined (or regulated) by a previously agreed rule or may be delivered to a UE through signaling.

In this case, the mapping information between the PCID and the subframe index in which the paging message is transmitted may be included in a system information block.

Table 10 shows an example in which different subframe indices have been mapped to different PCIDs within the same PCID group (PCID group 0).

TABLE 10

| PCID group 0 | Subframe index |
| --- | --- |
| cell ID 00000001 | 1, 2 |
| cell ID 00000010 | 3, 4 |
| cell ID 00000011 | 5, 6 |

Furthermore, if a subframe index (in which a paging message is transmitted) having a mapping relation with the M cell IDs of the same PCID group has been allocated by a network, a UE sequentially attempts the decoding of paging messages in subframe indices configured for each cell ID until the decoding of the paging message is successful.

For example, as described above, in the LTE/LTE-A system, when a UE acquires synchronization through a first synchronization signal (i.e. primary synchronization signal), the UE acquires synchronization again through a second synchronization signal (i.e., secondary synchronization signal) in a previous symbol.

In this case, a single idle state UE providing low latency and high reliability service attempts the decoding of a paging message until the reception of the paging message succeeds in subframe indices configured in M cell IDs that have been sequentially configured among the 168 sequences (or the PCIDs) of the same PCID group.

When the single idle state UE fails in the decoding of a paging message in a subframe mapped to a specific cell ID (corresponding to a subframe index), the single idle state UE continues to perform the decoding of a paging message in the subframes of subframe indices mapped to a next cell ID.

For example, when a single idle state UE succeeds in the decoding of a paging message in subframes (subframe indices 1, 2) mapped to the cell ID "00000001" of a PCID group "0", the single idle state UE stops decoding of a paging message in a subsequent subframe.

However, when the single idle state UE fails in the decoding of a paging message in the subframes (subframe indices 1, 2) mapped to the cell ID "00000001" of the PCID group 0, the single idle state UE sequentially performs the decoding of a paging message in subframes mapped to the cell ID "00000010" and cell "ID 00000011" of the PCID group 0, respectively.

Subframe indices mapped to the cell ID 00000010 are 3,4, and subframe indices mapped to the cell ID 00000011 are 5,6.

FIG. 12 is a flowchart showing an example of a method for a UE, providing low latency and high reliability service proposed in this specification, to receive a paging message.

First, the UE identifies whether a first paging message transmitted through a base station has been received during a paging period (S1210).

In this case, the UE may receive the first paging message at a paging occasion within the paging period.

If, as a result of the identification in step S1210, the first paging message has not been received during the paging period, the UE receives at least one synchronization signal from at least one base station (S1220).

In this case, the UE may receive the at least one synchronization signal in the paging period in step S1210 and a next paging period.

The synchronization signal includes a primary synchronization signal (PSS) and a secondary synchronization signal (SSS).

In this case, the UE may be a (single) idle state UE providing low latency and high reliability service.

That is, when the UE does not receive the first paging message in the paging period, it does not switch to a DRX mode and performs a cell search procedure again.

Thereafter, the UE detects at least one of the physical cell identifier (PCID) or PCID group of the at least one base station based on the at least one synchronization signal (S1230).

Thereafter, the UE identifies one or more subframes in which a second paging message will be received using at least one of the detected PCID or PCID group (S1240).

In this case, the second paging message may be the same message as the first paging message.

That is, the base station may transmit the second paging message by putting the second paging message forward to a next paging period after the paging period in which the first paging message is transmitted not the next paging period.

Thereafter, the UE receives the second paging message in the identified one or more subframes (S1250).

Thereafter, the UE sequentially performs decoding on the second paging message received in the one or more subframes (S1260).

In step S1260, when the UE succeeds in the decoding of the second paging message in a specific subframe of the identified one or more subframes, the UE does not perform decoding in a subframe subsequent to the specific subframe.

In this case, the index of the identified one or more subframes have a mapping relation with the detected PCID or PCID group.

The mapping relation may be pre-defined or received through signaling from the base station.

In this case, the PCID group may be detected by a primary synchronization signal (PSS), and the PCID may be detected by a secondary synchronization signal (SSS).

Furthermore, the PCID group includes three PCID groups, and 168 or 356 or 333 or 334 different PCIDs may be present in one PCID group.

Furthermore, the base station and the at least one base station may be included in the same tracking area (TA).

Furthermore, the detection sequence of the at least one synchronization signal of the UE may be determined by an entity that manages the tracking area.

The entity may be a mobility management entity (MME) or a primary base station.

Additionally, the UE may receive a synchronization signal from the base station prior to step S1210, may acquire time and frequency synchronization based on the received synchronization signal, and may detect the physical cell identifier (PCID) and PCID of the base station.

General Apparatus to which the Present Invention May be Applied

FIG. 13 illustrates a block diagram of a wireless communication apparatus according to an embodiment of the present invention.

Referring to FIG. 13, the wireless communication system includes a network node 1310 and multiple UEs 1320.

The network node 1310 includes a processor 1311, memory 1312 and a communication module 1313. The processor 1311 implements the functions, processes and/or methods proposed in FIGS. 1 to 12. The layers of a wired/wireless interface protocol may be implemented by the processor 1311. The memory 1312 is connected to the processor 1311 and stores various types of information for driving the processor 1311. The communication module 1313 is connected to the processor 1311 and transmits and/or receives wired/wireless signals. In particular, if the network node 1310 is an eNB, the communication module 1313 may include a radio frequency (RF) unit for transmitting/receiving radio signals.

The UE 1320 includes a processor 1321, memory 1322 and a communication module (or RF unit) 1323. The processor 1321 implements the functions, processes and/or methods proposed in FIGS. 1 to 12. The layers of a radio interface protocol may be implemented by the processor 1321. The memory 1322 is connected to the processor 1321 and stores various types of information for driving the processor 1321. The communication module 1323 is connected to the processor 1321 and transmits and/or receives radio signal.

The memory 1312, 1322 may be positioned inside or outside the processor 1311, 1321 and may be connected to the processor 1311, 1321 by various well-known means.

Furthermore, the network node 1310 (in the case of a base station) and/or the UE 1320 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The method of receiving a paging message in a wireless communication system according to the present invention has been illustrated as being applied to 3GPP LTE/LTE-A systems, but may be applied to various wireless communication systems in addition to the 3GPP LTE/LTE-A system.

The invention claimed is:

1. A method of performing, by a user equipment (UE), a paging in a wireless communication system, the method comprising:
identifying whether a first paging message transmitted through a base station has been received during a paging period;
receiving, from at least one base station, at least one synchronization signal if the first paging message has not been received during the paging period;
detecting a physical cell identifier (PCID) and PCID group of the at least one base station based on the at least one synchronization signal;
identifying one or more subframes in which a second paging message is to be received using the detected PCID or PCID group;
receiving the second paging message in the identified one or more subframes; and
sequentially performing decoding on the second paging message received in the one or more subframes.

2. The method of claim 1,
wherein when the decoding for the second paging message is successful in a specific subframe of the identified one or more subframes, decoding is not performed in a subframe subsequent to the specific subframe.

3. The method of claim 1,
wherein indices of the identified one or more subframes have a mapping relation with the detected PCID or PCID group.

4. The method of claim 3,
wherein the mapping relation is pre-defined or received through signaling from the base station.

5. The method of claim 1,
wherein the synchronization signal comprises a primary synchronization signal (PSS) and a secondary synchronization signal (SSS),
wherein the PCID group is detected by the primary synchronization signal (PSS), and
wherein the PCID is detected by the secondary synchronization signal (SSS).

6. The method of claim 5,
wherein the PCID group includes three PCID groups, and
wherein 168, 356, 333 or 334 different PCIDs are present in one PCID group.

7. The method of claim 1,
wherein the base station and the at least one base station are included in an identical tracking area (TA).

8. The method of claim 7,
wherein a detection sequence of the at least one synchronization signal is determined by an entity managing the tracking area.

9. The method of claim 8,
wherein the entity is a mobility management entity (MME) or a primary base station.

10. The method of claim 9,
wherein the user equipment is an idle state.

11. The method of claim 1,
wherein when the first paging message is not received during the paging period, switching to a discontinuous reception (DRX) mode is not performed.

12. A user equipment (UE) for performing a paging in a wireless communication system, the UE comprising:
a radio frequency (RF) unit for transmitting and receiving radio signals; and
a processor functionally connected to the RF unit,
wherein the processor is configured to:
identify whether a first paging message transmitted through a base station has been received during a paging period;
receive, from at least one base station, at least one synchronization signal if the first paging message has not been received during the paging period;
detect a physical cell identifier (PCID) and PCID group of the at least one base station based on the at least one synchronization signal;

identify one or more subframes in which a second paging message is to be received using the detected PCID or PCID group;
receive the second paging message in the identified one or more subframes; and
sequentially perform decoding on the second paging message received in the identified one or more subframes.

* * * * *